(12) United States Patent
Nurmi et al.

(10) Patent No.: US 8,130,207 B2
(45) Date of Patent: Mar. 6, 2012

(54) APPARATUS, METHOD AND COMPUTER PROGRAM PRODUCT FOR MANIPULATING A DEVICE USING DUAL SIDE INPUT DEVICES

(75) Inventors: Mikko Antero Nurmi, Tampere (FI); Mika Antero Rautava, Espoo (FI)

(73) Assignee: Nokia Corporation, Espoo (FI)

( * ) Notice: Subject to any disclaimer, the term of this patent is extended or adjusted under 35 U.S.C. 154(b) by 903 days.

(21) Appl. No.: 12/141,490

(22) Filed: Jun. 18, 2008

(65) Prior Publication Data

US 2009/0315834 A1    Dec. 24, 2009

(51) Int. Cl.
*G06F 3/041* (2006.01)
(52) U.S. Cl. .................. 345/173; 178/18.01; 200/512
(58) Field of Classification Search .............. 345/173; 200/512; 178/18.01
See application file for complete search history.

(56) References Cited

U.S. PATENT DOCUMENTS

| | | | |
|---|---|---|---|
| 5,708,460 A | 1/1998 | Young et al. | |
| 5,905,485 A * | 5/1999 | Podoloff ................. | 345/157 |
| 6,492,979 B1 | 12/2002 | Kent et al. | |
| 7,075,513 B2 | 7/2006 | Silfverberg et al. | |
| 2005/0195156 A1 | 9/2005 | Pihlaja et al. | |
| 2009/0325643 A1 * | 12/2009 | Hamadene et al. ........... | 455/566 |

FOREIGN PATENT DOCUMENTS

| | | |
|---|---|---|
| EP | 0 640 936 A1 | 3/1995 |
| GB | 2 384 649 A | 7/2003 |

OTHER PUBLICATIONS

International Search Report from PCT/FI2009/050254 dated Sep. 3, 2009.
Wigdor et al., "*Under the Table Interaction*," UIST'06, Oct. 15-18, 2006, Montreux, Switzerland, pp. 259-268.
Sugimoto et al., "*HybridTouch: An Intuitive Manipulation Technique for PDAs Using Their Front and Rear Surfaces*," MobileHCI'06, Sep. 12-15, 2006, Helsinki, Finland, pp. 137-140.
Wigdor et al., "*LucidTouch: A See-Through Mobile Device,*" UIST'07, Oct. 7-10, 2007, Newport, Rhode Island, pp. 1-10.

* cited by examiner

*Primary Examiner* — Amare Mengistu
*Assistant Examiner* — Joseph G Rodriguez
(74) *Attorney, Agent, or Firm* — Alston & Bird LLP

(57) ABSTRACT

An apparatus, method and computer program product are provided for using dual side input devices for controlling an electronic device and applications running thereon. According to one technique, a user take some action with respect to an adjustable feature associated with the electronic device (e.g., zoom and/or skew an image on a display screen) by simulating (or actually) bending or twisting the electronic device. According to another technique, the user may cause a region of an image displayed on the front of the device to be magnified by touching the back of the device at a location that corresponds to the region. According to yet another technique, the user may cause a graphical item displayed on the front of the electronic device to be rotated by essentially simulating the grabbing of the item with two or more fingers on either side of the electronic device and rolling the item.

19 Claims, 7 Drawing Sheets

APPARATUS, METHOD AND COMPUTER PROGRAM PRODUCT FOR MANIPULATING A DEVICE USING DUAL SIDE INPUT DEVICES

FIELD

Embodiments of the invention relate, generally, to electronic devices having an input device located on two sides of the electronic device and, in particular, to techniques for using those "dual side input devices."

BACKGROUND

As technology improves, electronic devices, such as cellular telephones, personal digital assistants (PDAs), pagers, and the like, appear to get smaller and smaller. With this decrease in size almost necessarily comes a decrease in the size of the display screens of those devices. At the same time, another advance in technology has been the use of these display screens as input devices for their corresponding electronic device. As a result, the display screens of many electronic devices are touch sensitive input devices, or touchscreens. However, because the display screens appear to be getting smaller over time, use of the display screen as a touch sensitive input device has become somewhat difficult. This is particularly true where it is intended that an individual use his or her finger to select a selectable item displayed on the touchscreen. As a user places his or her finger on a small item displayed on the touchscreen, the finger will likely occlude the item completely, as well as overlap some of the adjacent items displayed. Consequently, it is often difficult for the user to be certain which item he or she is selecting.

One solution that has been introduced to address this problem is to allow the user to control the electronic device, or applications running thereon, by touching the back of the device. According to this solution, in addition to providing a touchscreen, or similar touch-sensitive input device, on the front (or first side) of the electronic device, the back (or second side) of the device would likewise be able to receive input from the user. Like the touchscreen on the front (or first side) of the device, the input device on the back (or second side) of the electronic device may be touch sensitive. Alternatively, the input device on the back (or second side) of the device may comprise one or more cameras and/or an optical sensor array configured to detect the user's contact with the back of the device.

A need exists for ways in which to use the dual side input devices to manipulate the electronic device and applications running thereon.

BRIEF SUMMARY

In general, embodiments of the present invention provide an improvement by, among other things, providing several techniques for using a dual side input devices for controlling an electronic device and applications running thereon. In particular, according to one embodiment, a user may take some action with respect to an adjustable feature of an electronic device, such as zoom and/or skew an overall image on a display screen, or one or more graphical items displayed at a particular location within the image, by simulating the bending or twisting of the electronic device or, in one embodiment, actually bending or twisting the electronic device. In these embodiments, the electronic device may detect tactile inputs on the front and back sides of the device and, based on the relative locations and force of the detected tactile inputs, determine in which direction and how hard the user is attempting to bend or twist the electronic device. Depending upon the direction and force with which the user is simulating bending or twisting of the electronic device, the electronic device may take a particular action, such as cause the image (or one or more graphical items displayed at a particular location within the image) to be zoomed in, zoomed out, or skewed to a particular degree or extent and at a particular speed, and/or adjust another feature or parameter associated with the electronic device display screen, or the electronic device itself.

According to another embodiment, a user may cause a particular region or area of an image displayed on the front of the electronic device to be magnified, or zoomed in, by touching the back of the electronic device at a location that is aligned with the desired region. In yet another embodiment, the user may cause a graphical item or object displayed, for example, on the front side of the electronic device, to be rotated by essentially simulating the grabbing of the item with two or more fingers on either side of the electronic device and rolling the item. In particular, according to this embodiment, the electronic device may detect tactile inputs on the front and back sides of the electronic device at points that are aligned with each other and coincide with a graphical item displayed on a touchscreen on the front of the device. This may be a result of the user, for example, placing his or her thumb on the front touchscreen and his or her index or middle finger on the back input device, wherein the thumb and index finger would be touching but for the electronic device between them. The electronic device may thereafter detect a movement of the tactile inputs in opposite directions. For example, the user may move his or her thumb upward, while moving his or her index or middle finger downward, or vice versa. In response, the electronic device may rotate the graphical item in a direction that reflects the direction in which the user "rolled" the item and, in particular, a direction that coincides with the movement of the tactile input on the front touchscreen. For example, the electronic device may rotate the graphical item backwards, in response to movement of the user's thumb upward, while rotating the graphical item forwards in response to movement of the user's thumb downwards.

In accordance with one aspect, an apparatus is provided for adjusting an adjustable parameter in response to a user applying different amounts of pressure to input devices on first and second sides of the apparatus. In one embodiment, the apparatus may include a processor configured to: (1) determine a location on a first touch-sensitive input device associated with at least one first tactile input; (2) determine a location on a second touch-sensitive input device associated with the at least one second tactile input; (3) determine an amount of pressure associated with respective first and second tactile inputs; and (4) take an action with respect to at least one adjustable feature based at least in part on the relative amounts of pressure associated with respective first and second tactile inputs.

In accordance with another aspect, an apparatus is provided for rotating a graphical item displayed on a display screen in response to a user simulating the grabbing and rolling of the item. In one embodiment, the apparatus may include a processor configured to: (1) detect a first tactile input at a first location on a first touch-sensitive input device located on a first side of the apparatus; (2) detect a second input at a second location on a second side of the apparatus, wherein the first and second locations have a predefined relation with respect to one another; (3) detect a movement of the first tactile input in a first direction; (4) detect a movement of the second input in a second direction, wherein the first and second directions have a predefined relation with respect to one another; and (5) cause a display of a graphical item to be rotated in a direction corresponding to the first direction of movement of the first tactile input, in response to detecting the opposite movement of the first and second tactile inputs, respectively.

In accordance with yet another aspect, a method is provided adjusting an adjustable parameter in response to a user applying different amounts of pressure to input devices on first and second sides of an electronic device. In one embodiment, the method may include: (1) determining a location on a first touch-sensitive input device associated with at least one first tactile input; (2) determining a location on a second touch-sensitive input device associated with at least one second tactile input; (3) determining an amount of pressure associated with respective first and second tactile inputs; and (4) taking an action with respect to at least one adjustable feature based at least in part on the relative amounts of pressure associated with respective first and second tactile inputs.

In accordance with one aspect, a method is provided rotating a graphical item displayed on a display screen in response to a user simulating the grabbing and rolling of the item. In one embodiment, the method may include: (1) detecting a first tactile input at a first location on a first touch-sensitive input device located on a first side of an apparatus; (2) detecting a second input at a second location on a second side of the apparatus, wherein the first and second locations have a predefined relation with respect to one another; (3) detecting a movement of the first tactile input in a first direction; (4) detecting a movement of the second input in a second direction, wherein the first and second directions have a predefined relation with respect to one another; and (5) causing a display of a graphical item to be rotated in a direction corresponding to the first direction of movement of the first tactile input, in response to detecting the opposite movement of the first and second tactile inputs, respectively.

According to another aspect, a computer program product is provided for adjusting an adjustable parameter in response to a user applying different amounts of pressure to input devices on first and second sides of an electronic device. The computer program product may contain at least one computer-readable storage medium having computer-readable program code portions stored therein. The computer-readable program code portions of one embodiment may include: (1) a first executable portion for determining a location on a first touch-sensitive input device associated with at least one first tactile input; (2) a second executable portion for determining a location on a second touch-sensitive input device associated with at least one second tactile input; (3) a third executable portion for determining an amount of pressure associated with respective first and second tactile inputs; and (4) a fourth executable portion for taking an action with respect to at least one adjustable feature based at least in part on the relative amounts of pressure associated with respective first and second tactile inputs.

According to yet another aspect, a computer program product is provided for rotating a graphical item displayed on a display screen in response to a user simulating the grabbing and rolling of the item. The computer program product may contain at least one computer-readable storage medium having computer-readable program code portions stored therein. The computer-readable program code portions of one embodiment may include: (1) a first executable portion for detecting a first tactile input at a first location on a first touch-sensitive input device located on a first side of an apparatus; (2) a second executable portion for detecting a second input at a second location on a second side of the apparatus, wherein the first and second locations have a predefined relation with respect to one another; (3) a third executable portion for detecting a movement of the first tactile input in a first direction; (4) a fourth executable portion for detecting a movement of the second input in a second direction, wherein the first and second directions have a predefined relation with respect to one another; and (5) a fifth executable portion for causing a display of a graphical item to be rotated in a direction corresponding to the first direction of movement of the first tactile input, in response to detecting the opposite movement of the first and second tactile inputs, respectively.

In accordance with one aspect, an apparatus is provided for adjusting an adjustable parameter in response to a user applying different amounts of pressure to input devices on first and second sides of the apparatus. In one embodiment, the apparatus may include: (1) means for determining a location on a first touch-sensitive input device associated with at least one first tactile input; (2) means for determining a location on a second touch-sensitive input device associated with at least one second tactile input; (3) means for determining an amount of pressure associated with respective first and second tactile inputs; and (4) means for taking an action with respect to at least one adjustable feature based at least in part on the relative amounts of pressure associated with respective first and second tactile inputs.

In accordance with another aspect, an apparatus is provided for rotating a graphical item displayed on a display screen in response to a user simulating the grabbing and rolling of the item. In one embodiment, the apparatus may include: (1) means for detecting a first tactile input at a first location on a first touch-sensitive input device located on a first side of an apparatus; (2) means for detecting a second input at a second location on a second side of the apparatus, wherein the first and second locations have a predefined relation with respect to one another; (3) means for detecting a movement of the first tactile input in a first direction; (4) means for detecting a movement of the second input in a second direction, wherein the first and second directions have a predefined relation with respect to one another; and (5) means for causing a display of a graphical item to be rotated in a direction corresponding to the first direction of movement of the first tactile input, in response to detecting the opposite movement of the first and second tactile inputs, respectively.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Figure 1:
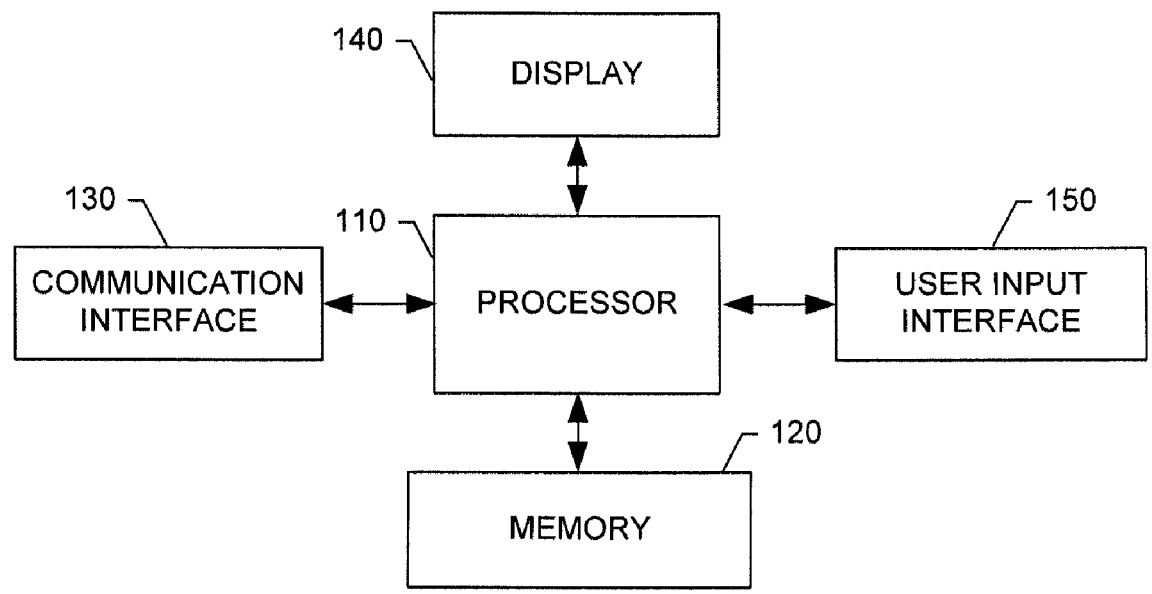
FIG. 1 is a schematic block diagram of an electronic device having dual side input devices in accordance with embodiments of the present invention.

Electronic Device:

Referring to FIG. 1, a block diagram of an electronic device (e.g., cellular telephone, personal digital assistant (PDA), laptop, etc.) having dual side input devices in accordance with embodiments of the present invention is shown. The electronic device includes various means for performing one or more functions in accordance with embodiments of the present invention, including those more particularly shown and described herein. It should be understood, however, that one or more of the electronic devices may include alternative means for performing one or more like functions, without departing from the spirit and scope of the present invention. As shown, the electronic device can generally include means, such as a processor 110 for performing or controlling the various functions of the electronic device.

In particular, the processor 110, or similar means, may be configured to perform the processes discussed in more detail below with regard to FIGS. 4, 6 and/or 7. For example, according to one embodiment, in order to take an action with respect to an adjustable parameter or feature associated with the electronic device (e.g., alter an image displayed by the electronic device) in response to a user simulating (or actually) bending or skewing the electronic device, the processor 110 may be configured to determine a location associated with at least one first and at least one second tactile input on a first and second touch-sensitive input device of the electronic device, respectively, wherein the first and second touch-sensitive input devices may be located, for example, on the front and back sides of the electronic device, respectively. The processor 110 may further be configured to determine an amount of pressure associated with respective first and second tactile inputs detected, and to take an action with respect to at least one adjustable parameter (e.g., cause the entire image, or one or more graphical items at a specific location on the image, to be enlarged, shrunk or skewed) based at least in part on the relative amounts of pressure associated with respective first and second tactile inputs.

According to another embodiment, in order to rotate a graphical item in response to a user simulating the grabbing and rolling of the item, the processor 110 may be configured to detect a first tactile input at a first location on a first touch-sensitive input device located on a first (e.g., front) side of the electronic device and to detect a second input at a second location on a second (e.g., back) side of the electronic device, wherein the first and second locations have a predefined relation with respect to one another (e.g., are substantially aligned). The processor 110 may further be configured to detect a movement of the first and second tactile inputs in first and second directions, respectively, wherein the first and second directions have a predefined relation with respect to one another (e.g., are substantially opposite). In response to detecting the movement of the first and second tactile inputs, the processor 110 may be configured to cause a display of a graphical item to be rotated in a direction corresponding to the first direction of movement of the first tactile input (e.g., the tactile input on the front of the device).

In one embodiment, the processor may be in communication with or include memory 120, such as volatile and/or non-volatile memory that stores content, data or the like. For example, the memory 120 typically stores content transmitted from, and/or received by, the electronic device. Also for example, the memory 120 typically stores software applications, instructions or the like for the processor to perform steps associated with operation of the electronic device in accordance with embodiments of the present invention. In particular, the memory 120 may store software applications, instructions or the like for the processor to perform the operations described above and below with regard to FIGS. 4, 6 and 7 for manipulating the electronic device and applications operating thereon through the use of dual side input devices.

For example, according to one embodiment, the memory 120 may store one or more modules for instructing the processor 110 to perform the operations described above with regard to taking an action with respect to an adjustable feature (e.g., altering an image) in response to a user bending or twisting the electronic device. These modules may include, for example, a detection module, a pressure detection module, and an action module. In one embodiment, the detection module may be configured to determine a location associated with at least one first and at least one second tactile input on a first and second touch-sensitive input device of the electronic device, respectively, wherein the first and second touch-sensitive input devices may be located, for example, on the front and back sides of the electronic device, respectively. The pressure detection module may further be configured to determine an amount of pressure associated with respective first and second tactile inputs detected, and the action module may be configured to take an action with respect to an adjustable parameter (e.g., cause the entire image, or one or more graphical items at a specific location on the image, to be enlarged, shrunk or skewed) based at least in part on the relative amounts of pressure associated with respective first and second tactile inputs.

According to another embodiment, the memory 120 may further store one or more modules for rotate a graphical item in response to a user simulating the grabbing and rolling of the item including, for example, a detection module, an identification module and a rotation module. In one embodiment, the detection module may be configured to detect a first tactile input at a first location on a first touch-sensitive input device located on a first (e.g., front) side of the electronic device and to detect a second input at a second location on a second (e.g., back) side of the electronic device, wherein the first and second locations have a predefined relation with respect to one another (e.g., are substantially aligned). The detection module may further be configured to detect a movement of the first and second tactile inputs in first and second directions, respectively, wherein the first and second directions have a predefined relation with respect to one another (e.g., are substantially opposite). The identification module may be configured to identify a graphical item displayed proximate the first location at which the first input was detected, and the rotation module may be configured to cause a display of the graphical item to be rotated in a direction corresponding to the first direction of movement of the first tactile input (e.g., the tactile input on the front of the device).

In addition to the memory 120, the processor 110 can also be connected to at least one interface or other means for displaying, transmitting and/or receiving data, content or the like. In this regard, the interface(s) can include at least one communication interface 130 or other means for transmitting and/or receiving data, content or the like, as well as at least one user interface that can include a display 140 and/or a user input interface 150. The user input interface, in turn, can comprise any of a number of devices allowing the electronic device to receive data from a user, such as a keypad, a touchscreen or touch display, a joystick or other input device. In particular, according to various embodiments of the present invention, the user input interface 150 may include separate input devices associated with the front and back sides of the electronic device (e.g., dual side input devices). Alternatively, the front and back input devices may comprise a single, continuous input device covering substantially the entire outer surface of the electronic device. In one embodiment, the front input device may comprise a touch-sensitive input device (e.g., touchscreen or touchpad), while the back input device may detect input through the use of a camera and/or one or more optical sensors. In another embodiment, both the front and back input devices (or the single, continuous input device including both the front and back input devices) may comprise touch-sensitive input devices, such as touchscreens or touchpads.

Figure 2:
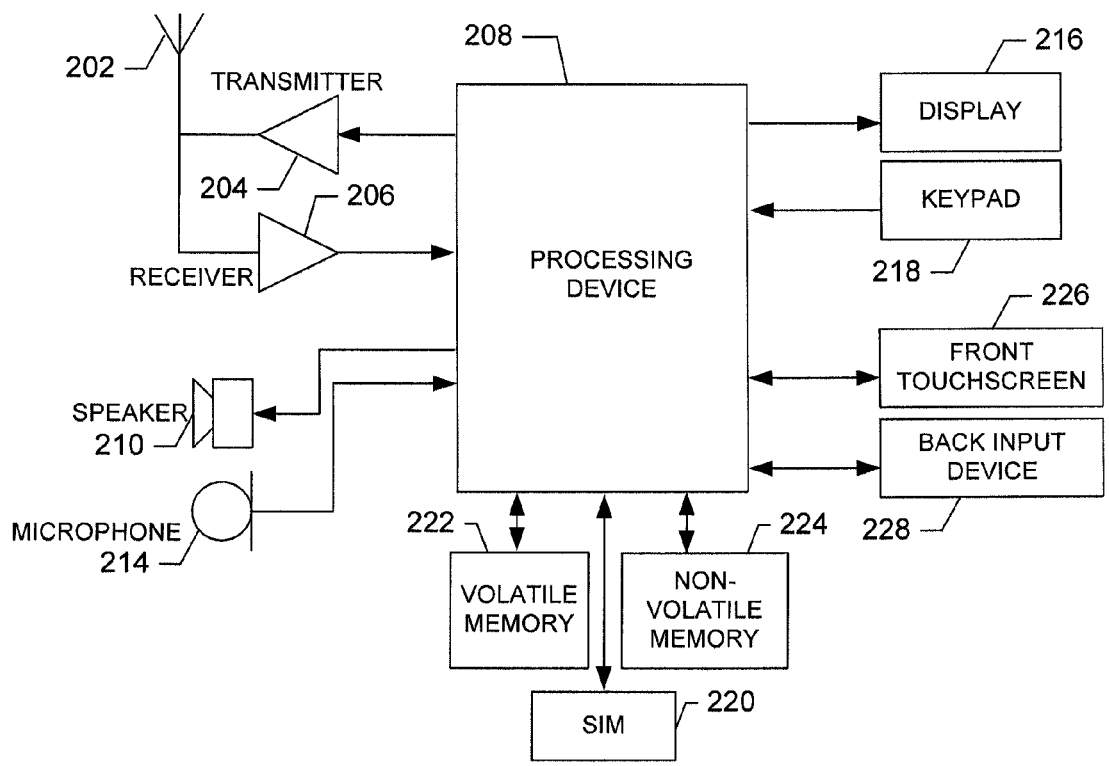
FIG. 2 is a schematic block diagram of a mobile station capable of operating in accordance with an embodiment of the present invention.

Reference is now made to FIG. 2, which illustrates one specific type of electronic device that may benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from embodiments of the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 2, in addition to an antenna 202, the mobile station 10 may include a transmitter 204, a receiver 206, and an apparatus that includes means, such as a processor 208, controller or the like, that provides signals to and receives signals from the transmitter 204 and receiver 206, respectively, and that performs the various other functions described above and below including, for example, the functions relating to controlling the mobile station 10 or applications executing thereon through the use of dual side input devices.

As discussed above with regard to FIG. 1 and in more detail below with regard to FIGS. 4, 6 and 7, in various embodiments, in order to take an action with respect to an adjustable parameter or feature associated with the mobile station 10 (e.g., alter an image displayed by the mobile station 10) in response to a user simulating (or actually) bending or skewing the mobile station 10, the processor 208 may be configured to determine a location associated with at least one first and at least one second tactile input on a first and second touch-sensitive input device of the mobile station 10, respectively, wherein the first and second touch-sensitive input devices may be located, for example, on the front and back sides of the mobile station 10, respectively. The processor 208 may further be configured to determine an amount of pressure associated with respective first and second tactile inputs detected, and to take an action with respect to an adjustable feature (e.g., cause the entire image, or one or more graphical items at a specific location on the image, to be enlarged, shrunk or skewed, adjust the volume, fast forward or rewind speed, adjust the brightness and/or color associated with a displayed image, etc.) based at least in part on the relative amounts of pressure associated with respective first and second tactile inputs.

According to another embodiment, in order to rotate a graphical item in response to a user simulating the grabbing and rolling of the item, the processor 208 may be configured to detect a first tactile input at a first location on a first touch-sensitive input device located on a first (e.g., front) side of the mobile station 10 and to detect a second input at a second location on a second (e.g., back) side of the mobile station 10, wherein the first and second locations have a predefined relation with respect to one another (e.g., are substantially aligned). The processor 208 may further be configured to detect a movement of the first and second tactile inputs in first and second directions, respectively, wherein the first and second directions have a predefined relation with respect to one another (e.g., are substantially opposite). In response to detecting the movement of the first and second tactile inputs, the processor 208 may be configured to cause a display of a graphical item to be rotated in a direction corresponding to the first direction of movement of the first tactile input (e.g., the tactile input on the front of the device).

As one of ordinary skill in the art would recognize, the signals provided to and received from the transmitter 204 and receiver 206, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processor 208 may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processor 208 thus also includes the functionality to convolutionally encode and interleave message and data prior to modulation and transmission. The processing device can additionally include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 210, a microphone 214, a display 216, all of which may be coupled to the processor 208. The user input interface, which allows the mobile device to receive data, can comprise any of a number of devices allowing the mobile device to receive data, such as a keypad 218; dual side input devices including, for example, a front touch-sensitive input device, such as a touchscreen or touchpad 226, and a back input device, such as a touchscreen or touchpad 228; a microphone 214; or other input device. As noted above, while FIG. 2 shows the front and back input devices as separate devices, according to various embodiments of the present invention, these dual side input devices may comprise a single, continuous input device. In addition, while reference is made to "front" and "back" input devices, as one of ordinary skill in the art will recognize in light of this disclosure, the dual side input devices may be located on any side of the electronic device without departing from the spirit and scope of embodiments of the present invention.

In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile station can include volatile memory 222, as well as other non-volatile memory 224, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs.

In particular, according to one embodiment, the memory may store the detection module, the pressure detection module, and the action module associated with taking an action with respect to an adjustable feature associated with the mobile station 10 (e.g., altering a displayed image) based on a user's simulating bending or twisting of the mobile station 10 described above with regard to FIG. 1. The memory may further store the detection module, the identification module, and the rotation module associated with rotating a graphical item also described above with regard to FIG. 1.

The apparatus, method and computer program product of embodiments of the present invention are primarily described in conjunction with mobile communications applications. It should be understood, however, that the apparatus, method and computer program product of embodiments of the present invention can be utilized in conjunction with a variety of other applications, both in the mobile communications industries and outside of the mobile communications industries. For example, the apparatus, method and computer program product of embodiments of the present invention can be utilized in conjunction with wireline and/or wireless network (e.g., Internet) applications.

Method of Manipulating an Electronic Device using Dual Side Input Devices

Referring now to FIGS. 3A through 7, several techniques for controlling an electronic device, and the applications executing thereon, through the use of dual side input devices in accordance with embodiments of the present invention will now be described. While the following assumes that the dual side input devices are located on the front and back sides of the electronic device, as one of ordinary skill in the art will recognize in light of this disclosure, embodiments of the present invention may likewise be used in association with input devices on other sides of the electronic device not limited to the front and the back and including, for example, input devices on opposing left and right sides of the device. Accordingly, despite the following reference to front and back input devices, embodiments of the present invention are not so limited.

Figure 3A:
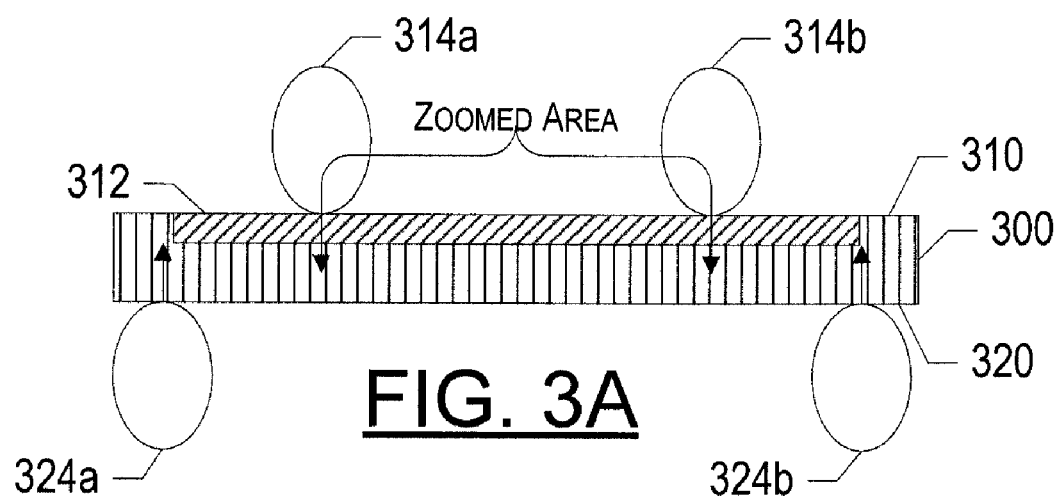
FIGS. 3A-3B illustrate a user bending, or simulating the bending of, an electronic device backwards and forwards through the use of dual side input devices in accordance with embodiments of the present invention.
Figure 3B:
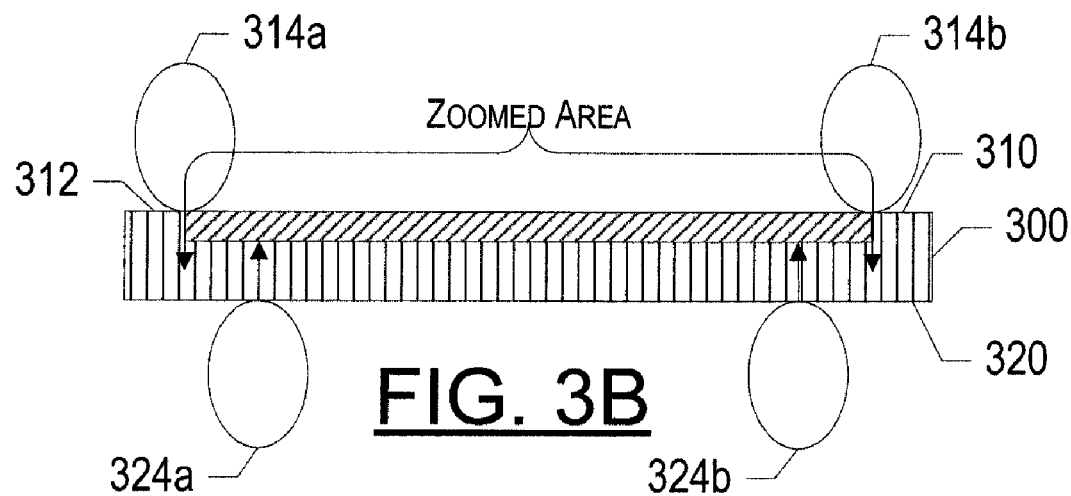
Figure 4:
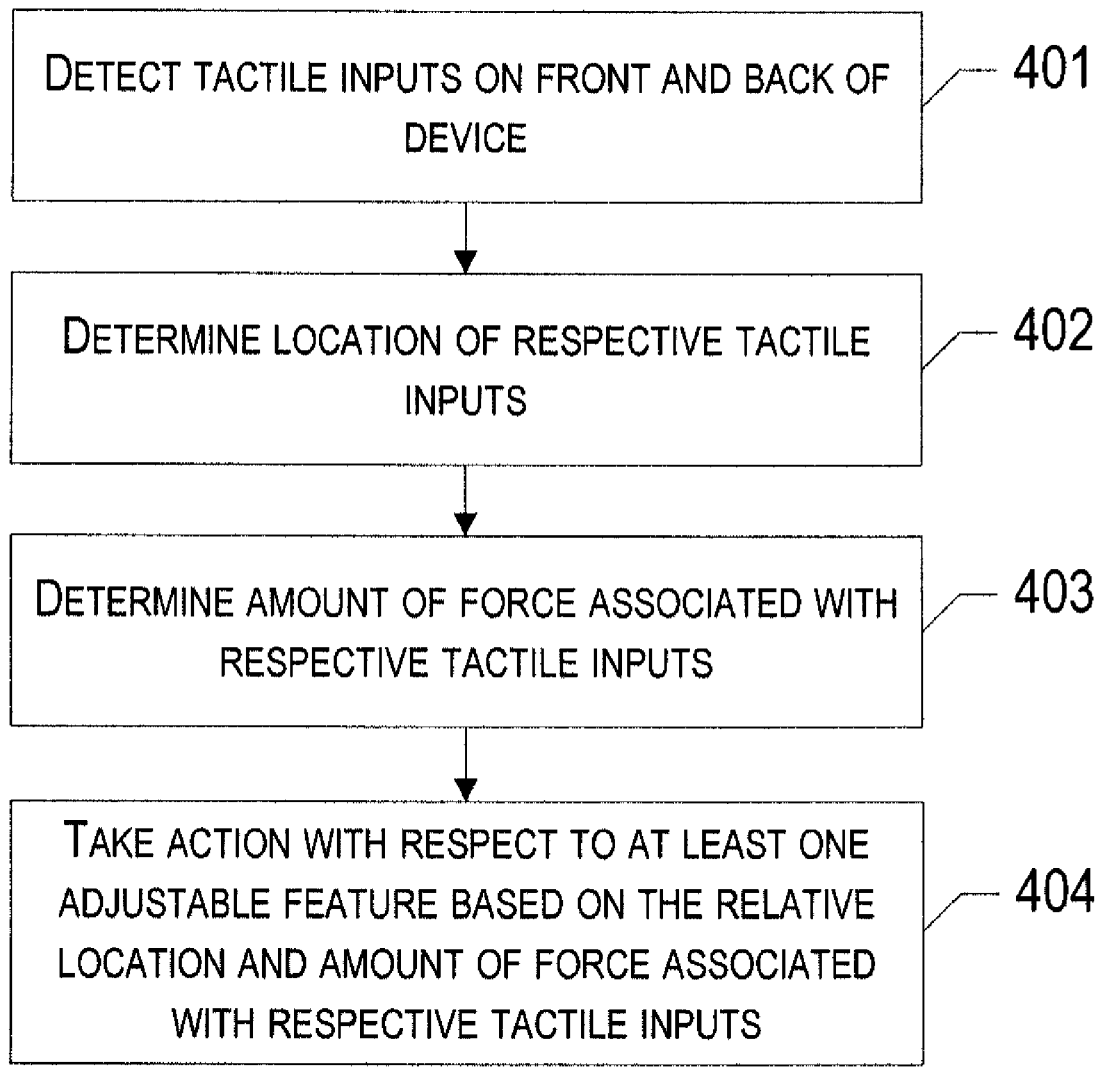
FIG. 4 is a flow chart illustrating the process of taking an action, such as zooming and/or skewing a displayed image, through simulating bending or twisting of the electronic device in accordance with embodiments of the present invention.

Reference is now made to FIGS. 3A-4, which illustrate a first technique for controlling the electronic device using dual side input devices in accordance with embodiments of the present invention, wherein the relative pressure applied to the dual side input devices may be used to adjust a parameter or feature associated with the electronic device (e.g., zoom in/out or skew an image, adjust a volume, fast forward or rewind speed, adjust the brightness or color of a displayed image, etc.). Turning first to FIGS. 3A and 3B, one manner in which a user may simulate bending or twisting of the electronic device in order to adjust a parameter (e.g., zoom in/out a displayed image) is shown. As shown, in order to simulate bending an electronic device 300 inward, or away from the user (as shown in FIG. 3A), or outward, or toward the user (as shown in FIG. 3B), such that the front surface 310 of the device 300 becomes concave or convex, respectively, the user may touch the front 310 and back 320 surfaces of the device 300 using four fingers, or other selection devices 314a, 314b, 324a, 324b at different locations and using different amounts of force or pressure at each point of contact.

In particular, turning to FIG. 3A, according to one embodiment in order to simulate bending (or actually bend) the device 300 away from the user, he or she may place his or her thumbs 314a, 314b on the front surface 310 of the device 320, place his or her index or middle fingers 324a, 324b on the back surface 320 of the device 300 at locations that are on the outside of the location at which each of his or her thumbs 314a, 314b are located, and then apply pressure from all four fingers or other selection devices 314a, 314b, 324a, 324b, wherein the amount of pressure applied by the thumbs 314a, 314b on the front surface 310 of the device 300 may be greater than, or relative to, the amount of pressure applied by the index or middle fingers 324a, 324b on the back surface 320 of the device 300. The result may be a bending, or simulation of bending, of the electronic device 300 inward or away from the user (i.e., so that the front surface 310 of the device 300 becomes concave). In response to detecting the tactile inputs on the front 310 and back 320 surfaces of the device 300 and determining the relative locations and amount of pressure associated with those tactile inputs, the device (e.g., means, such as a processor and, in one embodiment, the action module) may take some action with respect to an adjustable parameter, such as cause an image displayed on a display screen 312 on the front surface 310 of the device 300 to zoom in. In one embodiment, the entire image may be zoomed in. Alternatively, in another embodiment, a region defined, for example, by the location of the user's thumbs 314a, 314b on the front surface 310 of the device 300, or his or her index or middle fingers 324a, 324b on the back surface 310 of the device 300 may be zoomed in (referred to in FIGS. 3A & 3B as the "Zoomed Area").

Similarly, turning now to FIG. 3B, according to another embodiment, in order to simulate bending (or actually bend) the device 300 toward the user, he or she may place his or her thumbs 314a, 314b on the front surface 310 of the device 320, place his or her index or middle fingers 324a, 324b on the back surface 320 of the device 300 at locations that are on the inside of the location at which each of his or her thumbs 314a, 314b are located, and then apply pressure from all four fingers or other selection devices 314a, 314b, 324a, 324b, wherein the amount of pressure applied by the index or middle fingers 324a, 324b on the back surface 320 of the device 300 may be greater than, or relative to, the amount of pressure applied by the thumbs 314a, 314b on the front surface 310 of the device 300. The result may be a bending, or simulation of bending, of the electronic device 300 outward or toward the user (i.e., so that the front surface 310 of the device 300 becomes convex). In response to detecting the tactile inputs on the front 310 and back 320 surfaces of the device 300 and determining the relative locations and amount of pressure associated with those tactile inputs, the device (e.g., means, such as a processor and, in one embodiment, the action module) may take an action with respect to an adjustable feature or parameter, such as cause an image displayed on a display screen 312 on the front surface 310 of the device 300 to zoom out. In one embodiment, the entire image may be zoomed out. Alternatively, in another embodiment, a region defined, for example, by the location of the user's thumbs 314a, 314b on the front surface 310 of the device 300, or his or her index or middle fingers 324a, 324b on the back surface 310 of the device 300 may be zoomed out (referred to in FIGS. 3A & 3B as the "Zoomed Area").

While FIGS. 3A and 3B, as well as the below discussion with regard to FIG. 4, assume that the user has placed more than one finger, or other selection device, on each side of the electronic device (e.g., on both dual side input devices), embodiments of the present invention are not limited to use of multiple inputs on each side of the device. In particular, according to one embodiment, a single input may be detected on each of the front 310 and back 320 surfaces of the device 300. In response, the electronic device may take some action with respect to an adjustable parameter or feature (e.g., zoom level, volume, brightness, color, etc.), wherein the action taken may depend upon the relative pressure associated with the inputs detected. For example, according to one embodiment, the electronic device may zoom in or out the overall image displayed, or a particular graphical item within the displayed image, depending, for example, on whether more pressure was applied to the first (e.g., front) or second (e.g., back) side of the device. For example, if more pressure is detected in association with the first (e.g., front) tactile input, the image (or particular graphical item) may be zoomed in, while if more pressure is detected in association with the second (e.g., back) tactile input, the image (or particular graphical item) may be zoomed out.

While not shown, as discussed in more detail below with regard to FIG. 4, similar placement of the fingers, or other selection devices, and application of pressure may simulate twisting (or actually twist) the electronic device, as opposed to bending the electronic device inward or outward. Twisting (or simulating twisting of) the electronic device may result in the electronic device (e.g., means, such as a processor and, in one embodiment, the action module) skewing the image, or parts of the image, displayed on the display screen 312 on the front surface 310 of the device 300, or taking some other action with respect to a different adjustable parameter or feature.

Turning now to FIG. 4, the operations are illustrated that may be taken in order to take an action with respect to at least one adjustable parameter or feature associated with an electronic device (e.g., alter an image displayed on the electronic device display screen, such as on a touchscreen on the front side of the device), in response to a user simulating (or actually) bending or twisting the electronic device. As shown, the process may begin at Blocks 401 and 402, when the electronic device (e.g., means, such as a processor and, in one embodiment, the detection module) detects one or more tactile inputs on both a first and second touch-sensitive input device located one first and second sides (e.g., front and back sides) of the electronic device, respectively, and determines the location associated with respective tactile inputs. As described above, the tactile inputs may, for example, correspond to the user's left and right thumb being placed on the front side of the device (e.g., on a touchscreen located on the front side of the device) and his or her left and right index or middle fingers being placed on the back side of the device (e.g., on a touchscreen located on the back side of the device).

The electronic device (e.g., means, such as a processor and, in one embodiment, the detection module) may detect the tactile input(s) and determine their location via any number of techniques that are known to those of ordinary skill in the art. For example, the first and/or second (e.g., front and/or back) touchscreens may each comprise two layers that are held apart by spacers and have an electrical current running there between. When a user touches the first or second touchscreen, the two layers may make contact causing a change in the electrical current at the point of contact. The electronic device may note the change of the electrical current, as well as the coordinates of the point of contact.

Alternatively, wherein the first and/or second touchscreen uses a capacitive, as opposed to a resistive, system to detect tactile input, the first and/or second touchscreen may comprise a layer storing electrical charge. When a user touches the first or second touchscreen, some of the charge from that layer is transferred to the user causing the charge on the capacitive layer to decrease. Circuits may be located at each corner of the first and/or second touchscreen that measure the decrease in charge, such that the exact location of the tactile input can be calculated based on the relative differences in charge measured at each corner. Embodiments of the present invention can employ other types of touchscreens, such as a touchscreen that is configured to enable touch recognition by any of resistive, capacitive, infrared, strain gauge, surface wave, optical imaging, dispersive signal technology, acoustic pulse recognition or other techniques, and to then provide signals indicative of the location of the touch.

The touchscreen interfaces may be configured to receive an indication of an input in the form of a touch event at the touchscreen. As suggested above, the touch event may be defined as an actual physical contact between a selection device (e.g., a finger, stylus, pen, pencil, or other pointing device) and the touchscreen. Alternatively, a touch event may be defined as bringing the selection device in proximity to the touchscreen (e.g., hovering over a displayed object or approaching an object within a predefined distance).

Upon detecting the tactile inputs on the first and second sides (e.g., front and back sides) of the electronic device, the electronic device (e.g., means, such as a processor and, in one embodiment, the pressure detection module) may, at Block 403, determine the amount of pressure associated with each of the detected tactile inputs. In particular, according to one embodiment, one or more touch force or pressure sensors may be used in combination with a conductive panel in order to determine the amount of pressure associated with each of the detected tactile inputs.

In response to detecting the tactile inputs on the first and second sides (e.g., front and back sides) of the electronic device and determining the location and pressure associated with each tactile input, the electronic device (e.g., means, such as a processor and, in one embodiment, the action module) may, at Block 404, take some action with respect to an adjustable feature associated with the electronic device, wherein the action taken may be based on the relative locations and amounts of pressure associated with respective tactile inputs. For example, according to one embodiment, the electronic device (e.g., means such as a processor and, in one embodiment, the action module) may take some action with respect to an overall image displayed on a display screen of the electronic device (e.g., a touchscreen on the front side of the electronic device), or with respect to one or more graphical items of the image. The action may include, for example, zooming or skewing the overall image or one or more graphical items of the image, adjusting the brightness or color associated with the overall image, and/or the like.

In particular, according to one embodiment, the electronic device may first identify the direction in which the user is simulating (or actually) bending or twisting the electronic device based at least in part on the relative location and amount of pressure associated with each tactile input. For example, as discussed above with regard to FIGS. 3A and 3B, when the user's thumbs 314*a*, 314*b* were detected on the front surface 310 of the electronic device 300 at locations that were on the inside of the user's index or middle fingers 324*a*, 324*b* located on the back surface 320 of the electronic device 300, and when the amount of pressure applied by the thumbs exceeds the amount of pressure applied by the index or middle fingers, the identified direction of bending (or simulated bending) of the electronic device was inward, or away from the user. In contrast, when the user's thumbs 314*a*, 314*b* were detected on the front surface 310 of the electronic device 300 at locations that were on the outside of the user's index or middle fingers 324*a*, 324*b* located on the back surface 320 of the electronic device 300, and when the amount of pressure applied by the thumbs is less than the amount of pressure applied by the index or middle fingers, the identified direction of bending (or simulated bending) of the electronic device was outward, or toward from the user.

In addition to determining the direction in which the user was simulating (or actually) bending or twisting the electronic device, the electronic device may identify the overall force with which the user intended to bend, or simulate bending of, the electronic device. This may be based, for example, on the detected pressure associated with each tactile input.

For example, the greater the pressure detected at one or more of the tactile inputs, the greater the overall force it will be assumed (or identified) by the electronic device that the user intended to bend, or simulate bending of, the electronic device.

In one embodiment, the electronic device (e.g., means, such as a processor and, in one embodiment, the image alteration module) may then zoom or skew the overall image displayed on the electronic device display screen (e.g., a touchscreen on the front side of the electronic device) in a direction, to a degree or extent, and with a speed that correspond to the identified direction and overall force with which the user was bending or twisting (or simulating the bending or twisting of) the electronic device. For example, if it is determined that the user was bending (or simulating the bending of) the electronic device away from him- or herself, such that the front surface of the device was concave, the electronic device may zoom in (or enlarge) the overall image. Alternatively, if it is determined that the user was bending (or simulating the bending of) the electronic device toward from him- or herself, such that the front surface of the device was convex, the electronic device may zoom out (or shrink) the overall image. In yet another embodiment, if it is determined that the user was twisting (or simulating the twisting of) the electronic device, the electronic device may skew the overall image.

In one embodiment, the more overall force with which the user was bending (or simulating bending) or twisting (or simulating twisting) the electronic device, the greater the overall image may be zoomed in, zoomed out or skewed (i.e., the greater the degree of alteration). In contrast, the less overall force used by the user, the less the overall image may be zoomed in, zoomed out, or skewed (i.e., the lesser the degree of alteration). Alternatively, or addition, the amount of overall force used may directly relate to the speed in which the electronic device zooms or skews the overall image.

In yet another embodiment, only one or more graphical items within the overall image may be zoomed or skewed in response to the user simulating (or actually) bending or twisting the electronic device. In this embodiment, the electronic device may, for example, identify what is displayed on the front touchscreen at a location proximate the location of the front tactile inputs, and then only zoom or skew the graphical items identified. Alternatively, the electronic device may, for example, identify what is displayed on the front touchscreen at a location that corresponds to the location of the back tactile inputs, and then only zoom or skew those graphical items. For example, graphical items displayed at a location that is aligned with the back tactile inputs may be identified and zoomed or skewed.

In another embodiment, instead of zooming or skewing the image, the action taken at Block 404 may relate to another adjustable parameter or feature associated with the electronic device display screen (e.g., the front touchscreen), and/or with the electronic device itself. For example, according to one embodiment, a user may bend or twist a device in order to adjust the brightness, color, or similar adjustable parameter, associated with the electronic device display screen. For example, the user may bend (or simulating bending) the electronic device inward, or away from him- or herself in order to make the screen brighter, while bending (or simulating bending) the electronic device outward, or toward him- or herself in order to make the screen darker. Other parameters that may be adjusted based on the relative locations and/or amounts of pressure associated with detected tactile inputs may include, for example, the volume, the fast forward and/or rewind speed, and/or the like.

Figure 5B:
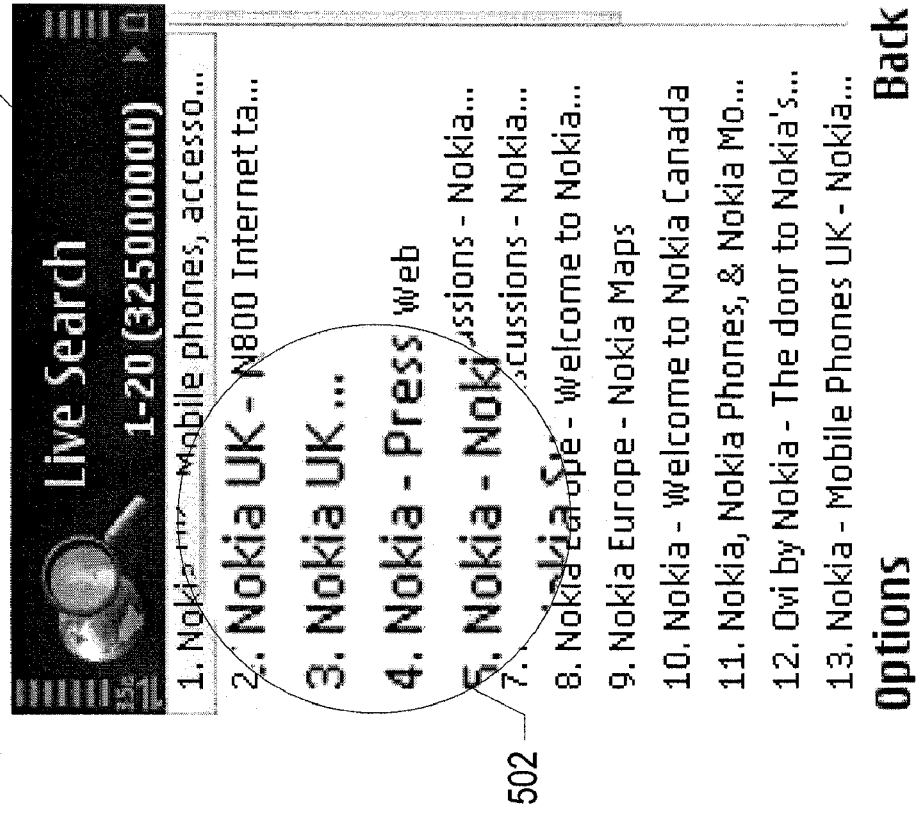
FIGS. 5A-5B illustrate the magnifying of a selected region of an electronic device display screen through the use of dual side input devices in accordance with embodiments of the present invention.
Figure 5A:
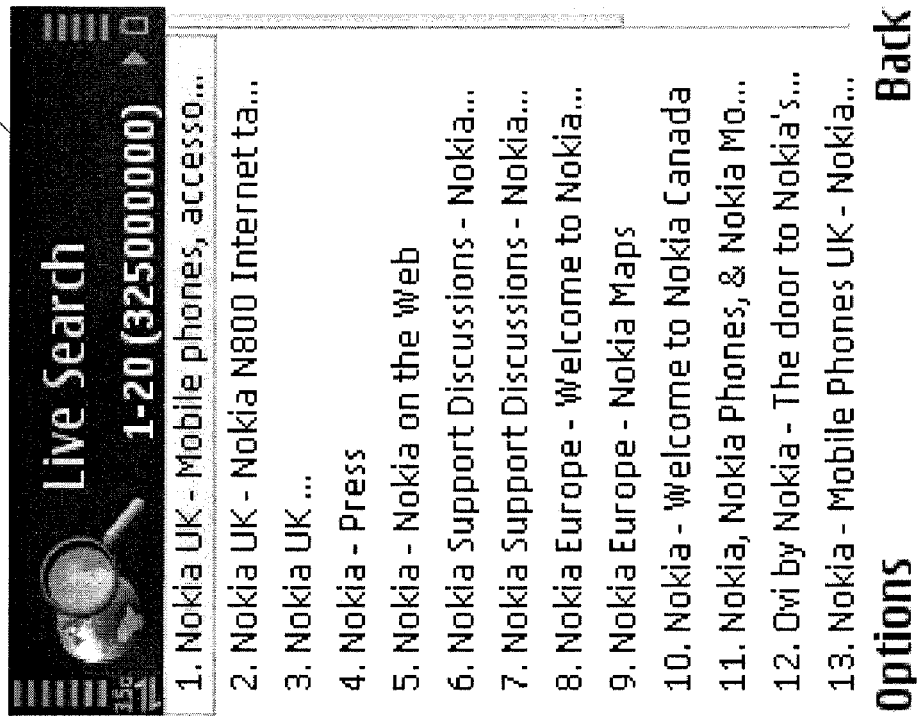
Figure 6:
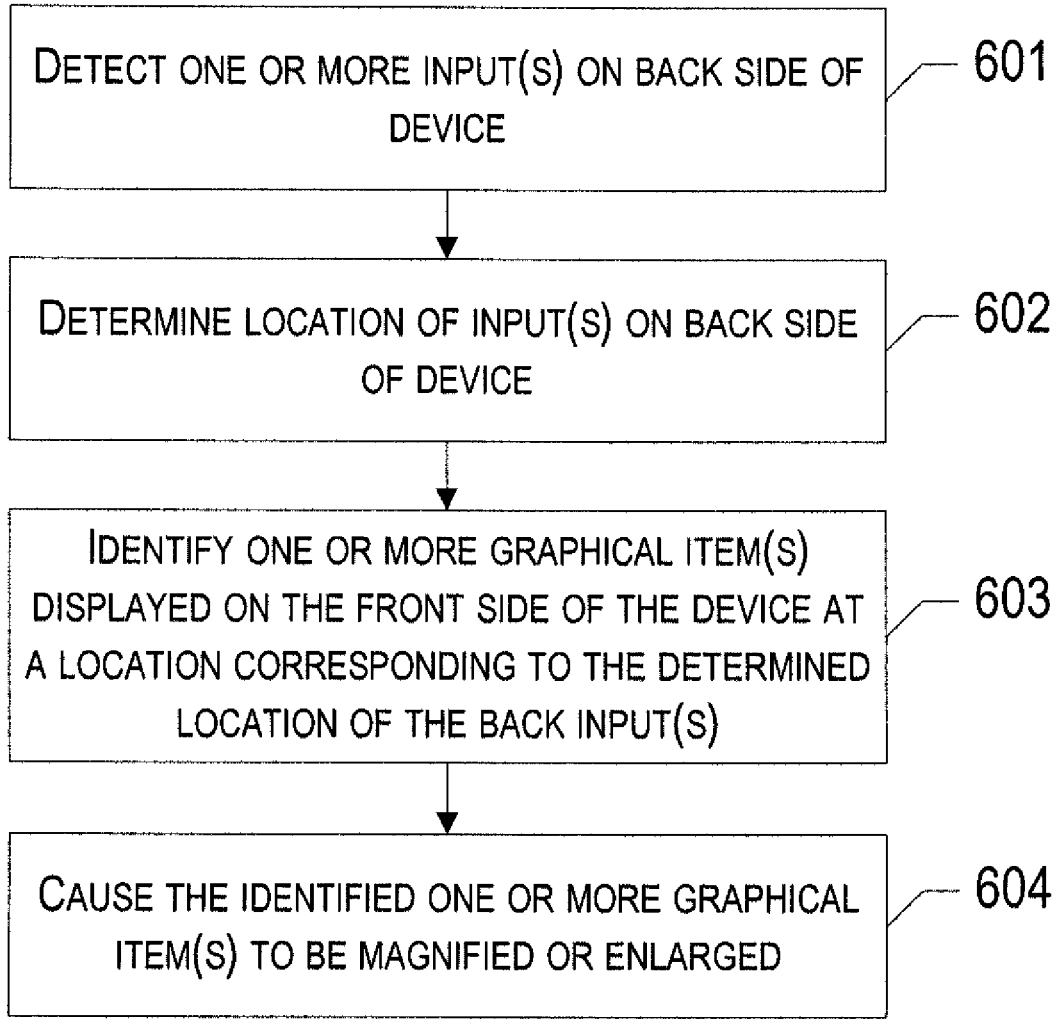
FIG. 6 is a flow chart illustrating the process of magnifying a selected region of a display screen through the use of dual side input devices in accordance with embodiments of the present invention.

Referring now to FIGS. 5A-6, a second technique for controlling an electronic device and the applications executing thereon using dual side input devices in accordance with embodiments of the present invention is shown. According to this embodiment, when a user touches the back side of the electronic device with one or more fingers, the electronic device may alter an image 501 displayed on the front of the electronic device (e.g., on a front touchscreen), by magnifying one or more graphical items that are displayed in an area 502 that corresponds to the location at which the user touched the back of the device.

As shown in FIG. 6, the process for magnifying the graphical item(s) displayed at a particular location on the front of an electronic device in response to a user touching a corresponding location on the back of the electronic device may begin at Blocks 601 and 602 when the electronic device (e.g., means, such as a processor and, in one embodiment, a detection module) detects one or more inputs on the back side of the device and determines their location. In one embodiment, the input device on the back of the device may comprise a touch-sensitive input device, such as a touchscreen or touchpad. In this embodiment, the electronic device may detect the one or more input(s) (i.e., tactile input(s)) and determine their location via any number of techniques that are known to those of ordinary skill in the art and discussed above with regard to FIG. 4. Alternatively, the back input device may not be touch-sensitive, in which case the electronic device may detect the input(s) on the back of the device using, for example, one or more cameras and/or an optical sensor array associated with the electronic device.

Upon detecting the input(s) and determining their location, the electronic device (e.g., means, such as a processor and, in one embodiment, an identification module) may, at Block 603, identify one or more graphical items displayed on the front side of the electronic device (e.g., on a front touchscreen) proximate a location that corresponds to the location on the back side of the device associated with each of the detected input(s). For example, according to one embodiment, in order to determine the location associated with the input on the back of the device, the electronic device may identify X and Y coordinates associated with the input. The electronic device may thereafter translate the X and Y coordinates associated with the back side of the device to X and Y coordinates associated with front of the device, wherein the back and front X and Y coordinates may be aligned. In order to identify the one or more graphical items displayed on the front side of the device at locations corresponding to the detected inputs on the back side of the device, the electronic device may identify all graphical items displayed within some distance (e.g., one half inch) from the translated front X and Y coordinates.

Once the graphical items have been identified, the electronic device (e.g., means, such as a processor and, in one embodiment, a magnification module) may, at Block 604, magnify the identified graphical item(s), or cause them to be enlarged. In other words, according to embodiments of the present invention, a user may create one or more virtual magnifying glasses for reviewing information displayed on an electronic device display screen by touching the back of the electronic device at a desired location. He or she may thereafter move the virtual magnifying glass(es) around by moving his or her finger(s), or other selection device(s), around on the back of the device. As one of ordinary skill in the art will recognize in light of this disclosure, according to embodiments of the present invention, a single or multiple virtual magnifying glasses may be simultaneously created and manipulated by touching the back side of the electronic device with a single or multiple fingers, or other selection devices.

According to another embodiment, not shown, instead of magnifying the identified graphical items, the electronic device may take some other action with respect to the identified graphical items. For example, according to one embodiment, the electronic device may place the graphical item(s) in edit mode, or otherwise activate the graphical item, such that the user can manipulate it. To illustrate, for example, if the identified graphical item includes a virtual business card, or V-Card, in response to the user touching the back side of the device at a location corresponding to the location at which the V-Card is displayed on the front side of the device, the electronic device may enable the user to edit the V-Card.

Figure 7:
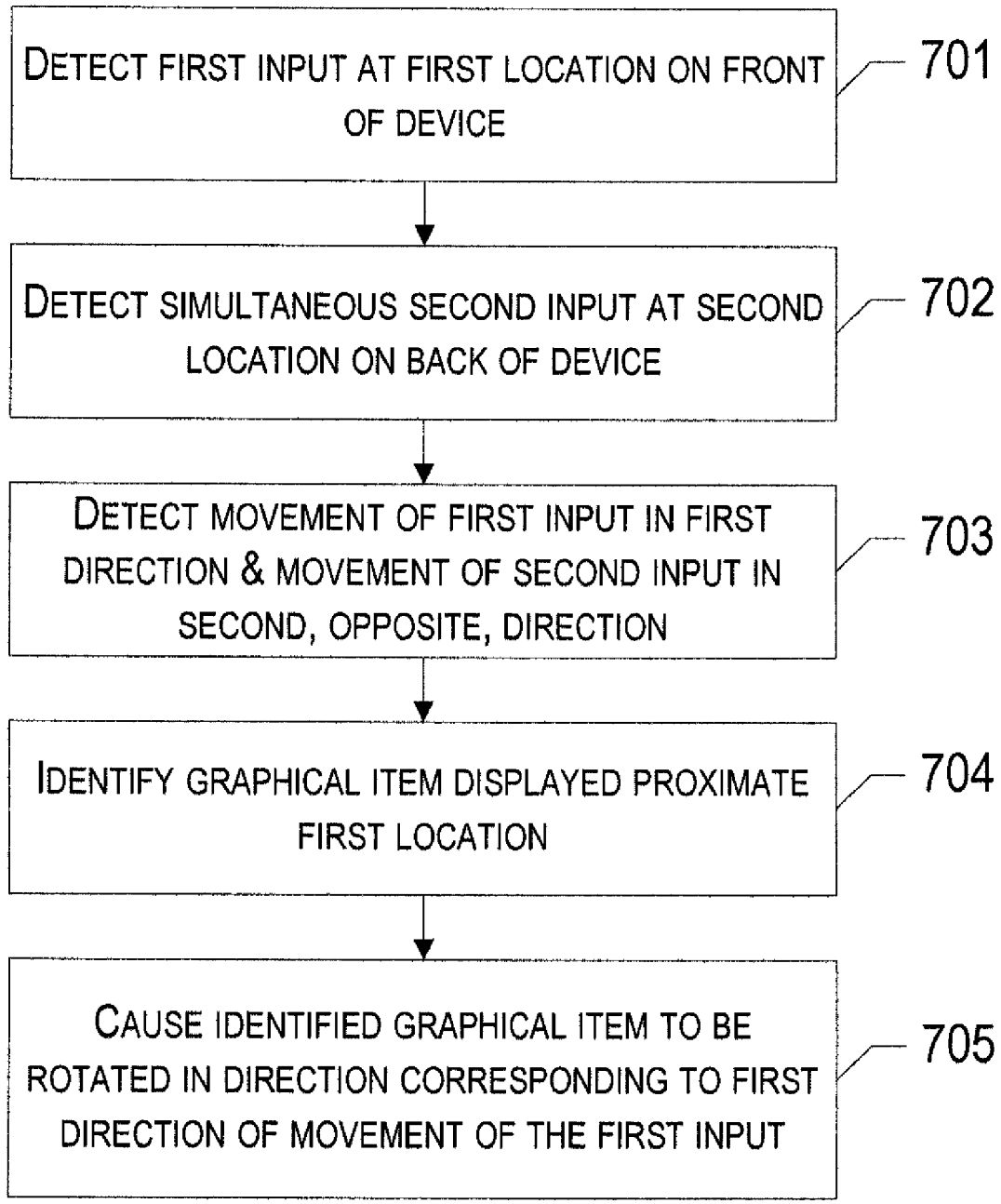
FIG. 7 is a flow chart illustrating the process of manipulating an object in three dimensions using dual side input devices in accordance with embodiments of the present invention.

Turning now to yet another technique for controlling an electronic device using dual side input devices, reference is made to FIG. 7, which illustrates the operations that may be taken in order to rotate a graphical item or object (e.g., a three-dimensional graphical item or object) displayed on one side of an electronic device (e.g., the front of the device) in response to a user simulating the grabbing and rolling of the graphical item or object in accordance with embodiments of the present invention. As shown, the process may begin at Block 701 when the electronic device (e.g., means, such as a processor and, in one embodiment, the detection module) may detect a first input at a first location on a first (e.g., front) side of the electronic device, and Block 702 when the electronic device (e.g., means, such as a processor and, in one embodiment, the detection module) may further detect a second input at a second location on a second (e.g., back) side of the electronic device, wherein the first and second locations have a predefined relation with respect to one another. According to one embodiment, the first and second inputs may be substantially simultaneous, and the first and second locations may be substantially aligned (e.g., if a perpendicular line is drawn from the location of the first input on the first side of the electronic device, the line may intersect with the location of the second input on the second side of the electronic device). In particular, according to one embodiment, the first and second inputs may result from a user grabbing the electronic device with two fingers, wherein the two fingers would be touching but for the presence of the electronic device between them. In another embodiment, while not aligned, the first and second inputs may be located at the same relative position on their respective sides of the device with respect to the overall image displayed. This may occur, for example, when the first side of the electronic device corresponds with front or back of the device, and the second side corresponds with the left or right side of the electronic device.

According to one embodiment, the first (e.g., front) and second (e.g., back) sides of the electronic device may each comprise a touch-sensitive input device (e.g., a touchscreen or touchpad). In this embodiment, the electronic device (e.g., means, such as a processor and, in one embodiment, the detection module) may detect the first and second inputs and determine their location using any of the known techniques discussed above with regard to FIG. 4. In another embodiment, while the first (e.g., front) side of the electronic device may comprise a touch-sensitive input device (e.g., a touchscreen or touchpad), the second (e.g., back) side of the electronic device may detect input via one or more cameras and/or an optical sensor array.

In either embodiment, the electronic device (e.g., means, such as a processor and, in one embodiment, the detection module) may, at Block 703, detect a movement of the first and second inputs in a first and second direction, respectively, wherein the first and second directions have a predefined relation with respect to one another. For example, the first and second directions may be substantially opposite (e.g., opposite within certain limits of angular degree). This may result, for example, from the user moving his or her front finger, or other selection device, upward, while moving his or her back finger, or other selection device, downward, or vice versa. As another example, this may result from the user moving his or her front finger, or other selection device, to the left, while moving his or her back finger, or other selection device, to the right, or vice versa.

In response to detecting the tactile inputs and the movement thereof, the electronic device (e.g., means, such as a processor and, in one embodiment, the identification module) may, at Block 704, identify a graphical item displayed at the first location on the display screen on the first (e.g., front) side of the electronic device. In other words, according to one embodiment, the electronic device may identify the graphical item that is displayed on the first (e.g., front) side of the device at the location where the user has touched the screen.

The electronic device (e.g., means, such as a processor and, in one embodiment, the rotation module) may thereafter, at Block 705, cause the identified graphical item to be rotated in a direction that corresponds to the direction in which the user simulated rolling of the graphical item and, in particular, in a direction that corresponds to the first direction of movement of the first input.

To illustrate, if, for example, the user moved his or her front finger upward, while moving his or her back finger downward, according to one embodiment of the present invention, the electronic device may cause the graphical item to rotate backwards (e.g., up and into the display). In contrast if the user moved his or her front finger downward, while moving his or her back finger upward, according to one embodiment, the electronic device may cause the graphical item to rotate forwards (e.g., down and into the display). As yet another example, if the user were to move his or her front finger to the right, and his or her back finger to the left, the electronic device may, in response, rotate the graphical item to the right and into the device.

According to one embodiment, the electronic device may freely rotate the graphical item in three dimensions at any desired angle or degree of rotation. Alternatively, according to another embodiment, the electronic device may be limited to rotating the graphical item to certain predefined degrees of rotation including, for example, 45°, 90° or 180°. For example, according to one embodiment, the electronic device may be limited to flipping a two-dimensional image (i.e., rotating the image 180°) in order to expose the "backside" of the image. In one embodiment, the backside of an image (e.g., a photo) may display the metadata associated with the image (e.g., describing when and where it was taken, etc.).

Conclusion:

As described above and as will be appreciated by one skilled in the art, embodiments of the present invention may be configured as an apparatus and method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 110 discussed above with reference to FIG. 1, or processing device 208, as discussed above with regard to FIG. 2, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 110 of FIG. 1 or processing device 208 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
at least one processor; and
at least one memory including computer program code, the at least one memory and the computer program code configured to, with the at least one processor, cause the apparatus to perform at least the following:
determine a location on a first touch-sensitive input device associated with at least one first tactile input;
determine a location on a second touch-sensitive input device associated with at least one second tactile input, wherein the first touch-sensitive input device and the second touch-sensitive input device are located on opposite sides of the apparatus;
determine an amount of pressure associated with respective first and second tactile inputs; and
take an action with respect to at least one adjustable feature based at least in part on the relative amounts of pressure associated with respective first and second tactile inputs.

2. The apparatus of claim 1, wherein in order to take an action, the at least one memory and the computer program code are further configured to, with the at least one processor, cause the apparatus to:
provide for alteration of an image displayed on the first touch-sensitive input device based at least in part on the relative amounts of pressure associated with respective first and second tactile inputs.

3. The apparatus of claim 1, wherein the first and second touch-sensitive input devices comprise a single, continuous touch-sensitive input device.

4. The apparatus of claim 1 further comprising:
one or more pressure sensors associated with the first and second touch-sensitive input devices, said one or more pressure sensors configured to detect the amount of pressure associated with respective first and second tactile inputs.

5. The apparatus of claim 1, wherein the at least one memory and the computer program code are further configured to, with the at least one processor, cause the apparatus to:
identify a direction in which a user is simulating bending or twisting the apparatus based at least in part on the relative locations and amounts of pressure associated with respective first and second tactile inputs.

6. The apparatus of claim 5, wherein the at least one memory and the computer program code are further configured to, with the at least one processor, cause the apparatus to:
identify a force with which the user is simulating bending or twisting the apparatus based at least in part on the determined amounts of pressure associated with respective first and second tactile inputs.

7. The apparatus of claim 6, wherein in order to take an action, the at least one memory and the computer program code are further configured to, with the at least one processor, cause the apparatus to:
cause an image to be enlarged, shrunk or skewed based at least in part on the identified direction and force with which the user is simulating bending or twisting of the apparatus.

8. The apparatus of claim 6, wherein in order to take an action, the at least one memory and the computer program code are further configured to, with the at least one processor, cause the apparatus to:
identify one or more graphical items displayed on the first touch-sensitive input device proximate the location at which the at least one first tactile input was detected; and
cause the one or more identified graphical items to be enlarged, shrunk or skewed based at least in part on the identified direction and force with which the user is simulating bending or twisting of the apparatus.

9. The apparatus of claim 6, wherein in order to take an action, the at least one memory and the computer program code are further configured to, with the at least one processor, cause the apparatus to:
identify one or more graphical items displayed on the first touch-sensitive input device at a location corresponding to the location at which the at least one second tactile input was detected; and
cause the one or more identified graphical items to be enlarged, shrunk or skewed based at least in part on the identified direction and force with which the user is simulating bending or twisting of the apparatus.

10. The apparatus of claim 1, wherein the at least one adjustable parameter is selected from a group consisting of a brightness and a color associated with an image, a volume, a rewind speed, and a fast forward speed.

11. The apparatus of claim 1, wherein the apparatus comprises a flexible material enabling the apparatus to be bent or twisted in response to the first and second tactile inputs.

12. A method comprising:
determining a location on a first touch-sensitive input device associated with at least one first tactile input;
determining a location on a second touch-sensitive input device associated with at least one second tactile input, wherein the first touch-sensitive input device and the second touch-sensitive input device are located on opposite sides of an apparatus;
determining an amount of pressure associated with respective first and second tactile inputs; and
taking an action with respect to at least one adjustable feature based at least in part on the relative amounts of pressure associated with respective first and second tactile inputs.

13. The method of claim 12, wherein taking an action further comprises:
providing for alteration of an image displayed on the first touch-sensitive input device based at least in part on the relative amounts of pressure associated with respective first and second tactile inputs.

14. The method of claim 12 further comprising:
identifying a direction in which a user is simulating bending or twisting the apparatus based at least in part on the relative locations and amounts of pressure associated with respective first and second tactile inputs; and
identifying a force with which the user is simulating bending or twisting the apparatus based at least in part on the determined amounts of pressure associated with respective first and second tactile inputs.

15. A computer program product comprising at least one computer-readable medium having computer-readable program code portions stored therein, the computer-readable program code portions comprising:
a first executable portion for determining a location on a first touch-sensitive input device associated with at least one first tactile input;
a second executable portion for determining a location on a second touch-sensitive input device associated with at least one second tactile input, wherein the first touch-sensitive input device and the second touch-sensitive input device are located on opposite sides of an apparatus;

a third executable portion for determining an amount of pressure associated with respective first and second tactile inputs; and a fourth executable portion for taking an action with respect to at least one adjustable feature based at least in part on the relative amounts of pressure associated with respective first and second tactile inputs.

16. The computer program product of claim 15, wherein the fourth executable portion is further configured to:

provide for alteration of an image displayed on the first touch-sensitive input device based at least in part on the relative amounts of pressure associated with respective first and second tactile inputs.

17. An apparatus comprising:

means for determining a location on a first touch-sensitive input device associated with at least one first tactile input;

means for determining a location on a second touch-sensitive input device associated with at least one second tactile input, wherein the first touch-sensitive input device and the second touch-sensitive input device are located on opposite sides of the apparatus;

means for determining an amount of pressure associated with respective first and second tactile inputs; and means for taking an action with respect to at least one adjustable feature based at least in part on the relative amounts of pressure associated with respective first and second tactile inputs.

18. The method of claim 12, wherein the first touch-sensitive input device is located on a front side of the apparatus, and wherein the second touch-sensitive input device is located on the back side of the apparatus 19. The method of claim 14, wherein taking an action further comprises:

causing an image to be enlarged, shrunk or skewed based at least in part on the identified direction and force with which the user is simulating bending or twisting of the apparatus.

* * * * *